(12) United States Patent
Yang

(10) Patent No.: US 9,081,175 B2
(45) Date of Patent: Jul. 14, 2015

(54) FLUORESCENCE OBSERVATION DEVICE, DOMED BASE AND FLUORESCENCE MICROSCOPE PROVIDED WITH MULTIPLE LIGHT SOURCES HAVING DIFFERENT ILLUMINATION ANGLES

(71) Applicant: Lumos Technology Co., Ltd., Taipei (TW)

(72) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 121 days.

(21) Appl. No.: 14/062,161

(22) Filed: Oct. 24, 2013

(65) Prior Publication Data

US 2014/0049817 A1 Feb. 20, 2014

Related U.S. Application Data

(63) Continuation-in-part of application No. 13/428,674, filed on Mar. 23, 2012, now Pat. No. 8,594,495.

(51) Int. Cl.
*G02B 21/00* (2006.01)
*G03B 15/05* (2006.01)
*G03B 17/56* (2006.01)

(52) U.S. Cl.
CPC ............ *G02B 21/0076* (2013.01); *G03B 15/05* (2013.01); *G03B 17/566* (2013.01); *G03B 2215/056* (2013.01); *G03B 2215/0539* (2013.01); *G03B 2215/0567* (2013.01)

(58) Field of Classification Search
CPC .. G02B 21/0076; G03B 15/05; G03B 17/566; G03B 2215/0539; G03B 2215/056; G03B 2215/0567
USPC ......... 359/385, 387, 390; 396/199; 362/3, 11, 362/140
See application file for complete search history.

(56) References Cited

U.S. PATENT DOCUMENTS

| | | | | |
|---|---|---|---|---|
| 5,038,258 | A * | 8/1991 | Koch et al. | 362/237 |
| 2006/0187653 | A1* | 8/2006 | Olsson | 362/111 |
| 2010/0103511 | A1* | 4/2010 | Soppelsa et al. | 359/390 |

* cited by examiner

*Primary Examiner* — Frank Font

(57) ABSTRACT

The present invention relates to a fluorescence observation device, a domed base and a fluorescence microscope. The fluorescence observation device includes a dome, a multi-angle light-emitting unit and a controller unit. The dome includes a transparent thermal insulation layer and a heat sink layer. The multi-angle light-emitting unit includes multiple directional narrow light field electro-luminescence devices thermally connected to the heat sink layer and adapted to emit light at different angles to pass through the transparent thermal insulation layer. The narrow light field electro-luminescence devices are selectively activated to emit light by the controller unit, so that the illumination angle of the multi-angle light-emitting unit can be adjusted. The fluorescence observation device can be combined with a base to constitute the domed base. Alternatively, narrow light field electro-luminescence devices are mounted on the base.

8 Claims, 9 Drawing Sheets

FLUORESCENCE OBSERVATION DEVICE, DOMED BASE AND FLUORESCENCE MICROSCOPE PROVIDED WITH MULTIPLE LIGHT SOURCES HAVING DIFFERENT ILLUMINATION ANGLES

CROSS REFERENCE TO RELATED APPLICATION

This application is a continuation-in-part of U.S. Ser. No. 13/428,674 filed on Mar. 23, 2012, the disclosure of which is incorporated herein by reference in its entirety.

FIELD OF THE INVENTION

The present invention relates to a fluorescence observation device, and more particularly, to a fluorescence observation device for use in a fluorescence microscope apparatus, a domed base for use in a fluorescence microscope apparatus, and a fluorescence microscope apparatus provided with the fluorescence observation device.

DESCRIPTION OF THE RELATED ART

In addition to its traditional applications in industrial inspection, false currency recognition and criminal identification, fluorescence technology has been extensively used to cc transgenic genes and analyze experimental results of genetic engineering. As such, the precise analysis of fluorescent images is becoming increasingly important for the successful implement of these applications.

The fluorescence technology described above involves irradiating a high frequency light beam to an object having a fluorescent characteristic, such as an anti-counterfeiting security thread on paper currency or a suspected blood stain in a crime scene, thereby exciting a fluorescence emission with a lower frequency. The fluorescence emission is then directed through a filter assembly, so that a clear fluorescent image for the security thread or the blood stain may be obtained and captured. In the technical field of biotechnology, the studies in transgenic organisms often involve introduction of a genetic material that is capable to express a fluorescent protein in the organisms. The presence or absence of the expressed fluorescent protein in the organisms can help confirm whether or not the exogenous gene of interest is introduced into the organisms and serve as a useful marker for tracing the transgenic organisms.

Common transgenic animals in which a fluorescent protein is constitutively expressed include murine, maggot, fish and jellyfish. These animals show high variations in body size and in response to different wavelengths of excitation light. For the experimental animals with relatively large body sizes, adequate assistive devices may be needed to confine animal's movement during the observation. Moreover, since experimental mice are usually purchased from laboratory animal centers, it should be ensured, preferably by using a portable fluorescence observation device, that each and every experimental mouse obtained from animal centers are capable of emitting fluorescence in response to light excitation.

Taking advantage of its short generation time, large brood size and strong resemblance to human organ system, fluorescent zebrafish (Danio rerio) is an ideal animal model for studies of human diseases, drug screening and toxicity. However, an optical microscope with variable magnification is normally needed for observation of zebrafish and other organisms of like size. Conventional fluorescence microscopes are long used by researchers to observe fluorescent objects, and the modifications and improvements thereof made by the key manufacturers in the past decades are centered on refining the travel path of excitation light, thereby elevating resolution and reducing image errors. As a result, the basic optical design of the fluorescence microscopes remains unchanged in decades.

However, it is well-known that irradiation energy is inversely proportional to the square of the distance from the light source. In order to overcome the problem of insufficient illumination due to the long distance from the excitation light source to the object under observation, the conventional fluorescence microscopes are typically designed to emit an increased intensity of light. Such design, however, is harmful to small-size organisms, such as zebrafish, whose proteins would be easily denatured by heat during observation. Furthermore, since the conventional fluorescent microscope is configured to irradiate excitation light towards the observed object in a vertical direction, the reflected light from the object, i.e., the noise having a relatively short wavelength, is so strong that the fluorescence excited by the excitation light, i.e., the fluorescence signal having a relatively long wavelength, is far less intensive than the reflected noise light. As a consequence, the conventional fluorescent microscopes have to be additionally equipped with an extremely expensive optical construction to improve the signal-to-noise ratio, and may be sold at a price up to hundreds of thousands of RMB.

As the fluorescent microscopes available in the market are normally incompatible with common optical microscopes, the laboratories that want to observe fluorescent objects are imperatively forced to purchase fluorescent microscopes at high cost. Therefore, there exists a need for an assistive device that can help convert a common optical microscope into a fluorescent microscope.

For the purpose of pursuing analysis and observation, fluorescent proteins that can be excited by a ultra-violet light source, a deep-blue light source or a green light source to emit blue, green or red light are often adopted in biotech experiments. FIG. 10 shows a provisional assistive device 70, which comprises two bellow tubes 74, each being installed at the front end thereof with a ultra-violet light source 72 and being manually adjustable to an appropriate angle to provide illumination on a petri dish 76 containing fluorescent objects. However, in the case where the object lens 78 is distant from the observed object by only 2-3 centimeters, there is no way for the bellow tubes 74 to get into the tiny gap between the object lens 78 and the observed object due to the limitation of their structure. In that case, the bellow tubes 74 cannot be adjusted at a desired angle to provide sufficient and uniform illumination on the observed object, leading to an imprecise quantification of the experiment results shown on the captured images.

When the fluorescence experiments described above involve handling of small living organisms, such as zebrafish and maggot, the researchers would have to face the difficulty in handling moving objects, let alone zebrafish would easily die during a prolonged observation period due to deficiency of dissolved oxygen in the water drop. All of these difficulties, including the limitation to observation time and the non-uniform illumination provided by the light source, have increased the failure rate of the fluorescence experiments. The conventional systems are also unsuitable for larger experimental animals, such as mice, in view of difficulty in keeping them within the illuminated region and the damage and contamination they may cause to the systems.

A solution to the problems above has been proposed by the present Applicant in Chinese Patent Application No. 201210402931.5, entitled "Fluorescent Assistive Device for Use in Microscopic Optical Image Capture Apparatus And Microscopic Optical Image Capture Apparatus Provided with Same". As shown in FIG. 11, the proposed device comprises a cover 82 for accommodating a predetermined observation site located on the base 84, so that the cover 82 and the base 84 cooperatively define a dark chamber 86 for observing an object of interest. The cover 82 is provided on its inner wall with multiple light source units 88. The positions of the light source units 88 can be changed along a guide rail on the cover 82 by adjusting a swivel knob 80, so as to provide desired illumination on the observed object.

While the fluorescent assistive device stated above can provide sufficient and uniform illumination on the observed object, the heat generated by the light source units 88 tends to be retained in the dark chamber 86 due to lack of heat dissipation path. The increased temperature in the dark chamber 86 would potentially increase the failure rate of the experiments. Moreover, the device stated above should be equipped with a mechanical or electronic swivel means for adjusting the position of the light source, resulting in high manufacture cost and causing additional maintenance problem. The fluorescent assistive device still has room for improvement.

Therefore, there is a need for a user-friendly fluorescence observation device that is capable of providing uniform illumination and has an adjustable illumination angle relative to the object under observation, so that there is no need for the user to pay much attention on adjustment of the light source. Preferably, the fluorescence observation device is capable of preventing the interference of ambient light to facilitate the observing and recording of the experimental results and rapidly dissipating the heat generated by illumination to minimize the temperature rise inside the dome and simplifying the mechanism needed for adjusting the illumination angle to reduce the manufacture cost and prolong the product lifespan.

In response to the need stated above, a fluorescence observation device and a microscopic image capturing device are disclosed. For observing an experimental animal with a relatively large body size, the simple style fluorescence observation device disclosed herein may be used. In contrast, for observing experimental animals with small body sizes, a delicate fluorescence observation device disclosed herein can be used alone or in combination with a microscope base to enhance the performance of the microscope, thereby fulfilling the needs of researchers, without compromising the quality of observation and recording. The fluorescence observation device disclosed herein provides a reliable and uncomplicated operating platform for handling a broad variety of experiments, while having an advantage of cost effectiveness. It is no doubt that the fluorescence observation device disclosed herein achieves an extremely high performance to price ratio.

In contrast to the traditional fluorescence microscopes, the device disclosed herein provides a near-field light source adapted to emit excitation light at variable angles, thereby obtaining a dark-field fluorescence image, and uses dark-field illumination to eliminate the interference of the reflected excitation light, thereby remarkably reducing the intensity of excitation light without compromising the image quality. Furthermore, taking advantage of using the near-field light source, the device disclosed herein may employ a light source adapted to emit light with reduced brightness, such as an LED, and installed proximal to the observed object, thereby reducing the distance through which excitation light has to travel to reach the observed object. Especially, the device disclosed herein includes a transparent inner shell with thermal insulation property to avoid a significant temperature rise in the observation zone and further prevent the light source from being contacted or contaminated by experiment animals. The device disclosed herein is also advantageous in simplicity in structure, high cost effectiveness and high versatility for being used alone as an assistive device or used in conjunction with a conventional optical microscope. Taking advantage of its compatibility with conventional instruments and high cost effectiveness, the device disclosed herein allows researchers to improve the quality of experiments at low cost.

SUMMARY OF THE INVENTION

Accordingly, an aspect of the present invention is to provide a modularized fluorescence observation device which serves as a reliable and user-friendly operating platform to ensure the success of experiments.

Another aspect of the invention is to provide a fluorescence observation device which separates the light source and the observed object, thereby preventing the experiment animals under observation from getting in touch with the light source and further preventing the experiment animals from being injured by the heat generated by the light source.

A still another aspect of the invention is to provide a fluorescence observation device which includes a transparent thermal insulation layer to separate the light source from the observed object, thereby preventing the light source from being damaged or contaminated by the experiment animals.

A still another aspect of the invention is to provide a fluorescence observation device which comprises a low angle excitation light source provided with a plurality of light-emitting devices having different illumination angles, thereby making it possible to emit light at an adjustable angle. The device is extremely simple in structure and, therefore, has a reduced manufacture cost and prolonged lifespan.

A still another aspect of the invention is to provide a domed base equipped with the fluorescence observation device described above, which is highly compatible with a microscopic image capturing device, such as a conventional optical microscope or a microscopic camera. Therefore, the domed base can be readily combined with a conventional optical microscope to make it possible to observe a fluorescent object and make it more versatile in usage.

A still another aspect of the invention is to provide a domed base quipped with the fluorescence observation device described above, which is capable of preventing the interference of ambient light and stray light to improve the quality of fluorescence images.

A still another aspect of the invention is to provide a fluorescence microscope quipped with the fluorescence observation device described above, which provides a near-field light source to reduce the brightness of light emitted therefrom and the heat generated thereby and further prevents the generated heat from entering the environment where the experiment animal resides and exhibits high heat dissipation efficiency. Therefore, the temperature of the environment where the experiment animal resides is kept constant.

A still another aspect of the invention is to provide a fluorescence microscope having high heat dissipation efficiency, whereby the heat generated from the light source can be dissipated rapidly to the ambient, thereby reducing the interference of temperature rise to the observed object and facilitating the efficiency and precision of the experiments.

There is provided herein a fluorescence observation device provided with multiple light sources having different illumination angles, for covering on an observation support member and for observing a fluorescent object placed on the observation support member. The fluorescence observation device comprises a dome cooperating with the observation support member to define an accommodating chamber for housing the fluorescent object and formed with an observation aperture; a multi-angle light-emitting unit comprising a plurality of narrow light field electro-luminescence devices for emitting excitation light at different illumination angles towards the accommodating chamber through the transparent thermal insulation layer; and a controller unit for controlling the illumination angles of the narrow light field electro-luminescence devices. The dome comprising a transparent thermal insulation layer arranged to face the accommodating chamber; and a heat sink layer having a surface disposed on a surface of the transparent thermal insulation layer remote from the accommodating chamber, the heat sink layer having a greater thermal conductivity coefficient compared with the transparent thermal insulation layer and having a lower transparency at least in the visible spectrum compared with the transparent thermal insulation layer.

There is also provided herein a domed base for use in a fluorescence microscopy optical apparatus and for observing a fluorescent object. The domed base comprises a base including an observation support member for observing the fluorescent object; a dome cooperating with the base to define an accommodating chamber for housing the fluorescent object and formed with an observation aperture; a multi-angle light-emitting unit comprising a plurality of narrow light field electro-luminescence devices for emitting excitation light at different illumination angles towards the accommodating chamber through the transparent thermal insulation layer; and a controller unit for controlling the illumination angles of the narrow light field electro-luminescence devices. The dome comprises a transparent thermal insulation layer arranged to face the accommodating chamber; and a heat sink layer having a surface disposed on a surface of the transparent thermal insulation layer remote from the accommodating chamber, the heat sink layer having a greater thermal conductivity coefficient compared with the transparent thermal insulation layer and having a lower transparency at least in the visible spectrum compared with the transparent thermal insulation layer.

There is further provided herein a fluorescence microscopy optical apparatus for observing a fluorescent object. The fluorescence microscopy optical apparatus comprises a main body; an object lens mounted on the main body; and a fluorescence observation device. The fluorescence observation device comprises a base including an observation support member for observing the fluorescent object; a dome cooperating with the base to define an accommodating chamber for housing the fluorescent object, the dome being formed with an observation aperture, through which the object lens may capture an image of the fluorescent object placed on the observation support member; a multi-angle light-emitting unit comprising a plurality of narrow light field electro-luminescence devices for emitting excitation light at different illumination angles towards the accommodating chamber through the transparent thermal insulation layer; and a controller unit for controlling the illumination angles of the narrow light field electro-luminescence devices. The dome comprises a transparent thermal insulation layer arranged to face the accommodating chamber; and a heat sink layer having a surface disposed on a surface of the transparent thermal insulation layer remote from the accommodating chamber, the heat sink layer having a greater thermal conductivity coefficient compared with the transparent thermal insulation layer and having a lower transparency at least in the visible spectrum compared with the transparent thermal insulation layer.

By virtue of the arc-shaped contour of the dome, the fluorescence observation device, the domed base and the fluorescence microscopy optical apparatus disclosed herein are capable of providing illumination at a desired angle by using the controller unit to selectively control the narrow light field electro-luminescence devices that are positioned on the dome to emit light at different angles. Alternatively, the narrow light field electro-luminescence devices that are positioned on the base, so that the light beams emitted from the respective narrow light field electro-luminescence devices are reflected at different angles by the arc-shaped dome. In this case, the base may further include a thermal conductive layer, so that the heat generated by the narrow light field electro-luminescence devices can be rapidly dissipated to the ambient through the heat sink layer of the dome or the thermal conductive layer of the base. As a desired result, the temperature in the accommodating chamber is kept constant to protect the observed living organisms from suffering temperature stress. Furthermore, the device disclosed herein has an advantage of being simple in structure and, therefore, has a reduced manufacture cost and a prolonged lifespan.

Taking advantage of its high operability, the fluorescence observation device disclosed herein can be readily combined with a microscopic image capturing device, such as a conventional optical microscope or a microscopic camera, whereby the microscopic image capturing device is made more versatile in usage to fulfill the needs of consumers and the efficiency and precision of the experiments are also improved. The invention achieves the objects described above accordingly.

BRIEF DESCRIPTION OF THE DRAWINGS

The above and other objects, features and effects of the invention will become apparent with reference to the following description of the preferred embodiments taken in conjunction with the accompanying drawings, wherein like numerals designate similar parts.

DETAILED DESCRIPTION OF THE INVENTION

Figure 1:
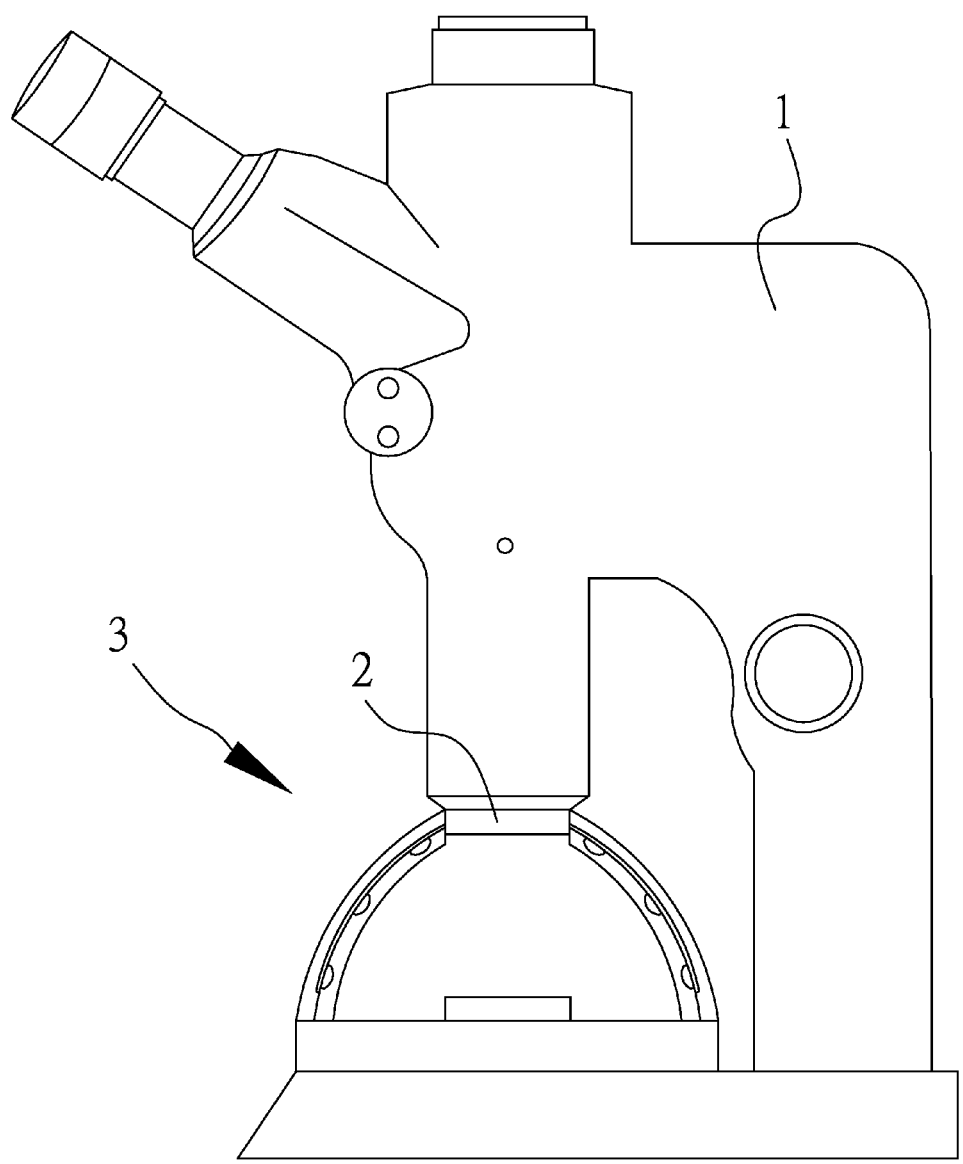
FIG. 1 is a schematic side view of the fluorescence microscopy optical apparatus according to the first preferred embodiment of the invention.
Figure 2:
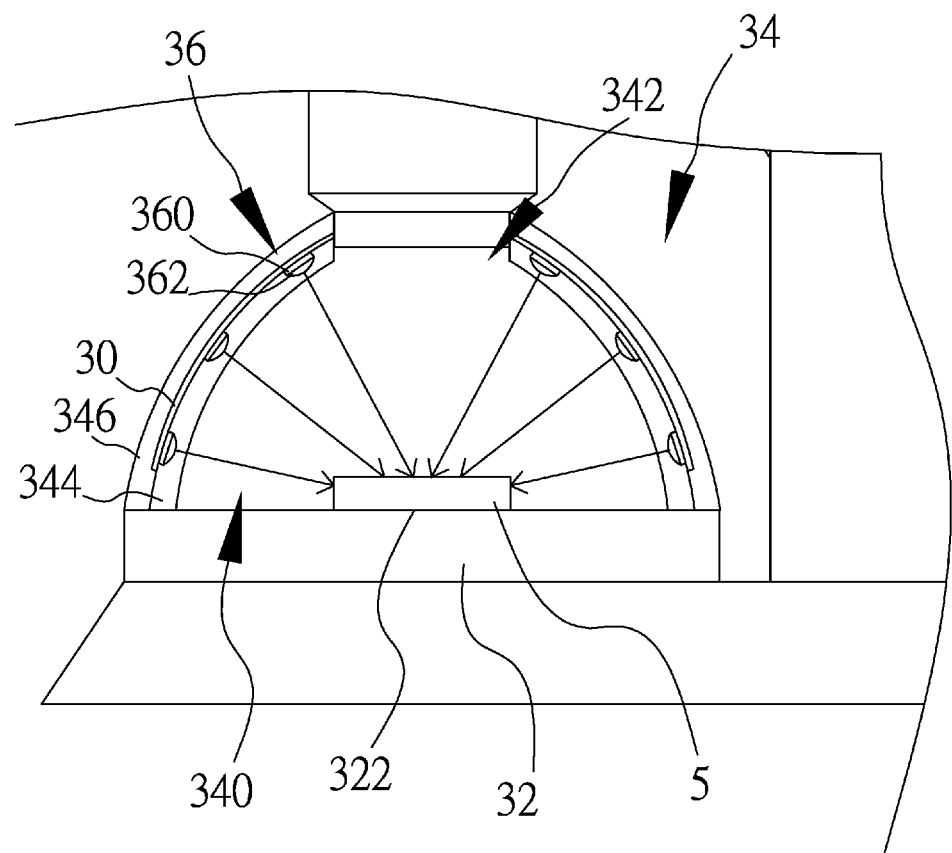
FIG. 2 is a schematic enlarged partial view of the fluorescence microscopy optical apparatus of FIG. 1, showing the structure of the fluorescence observation device.
Figure 3:
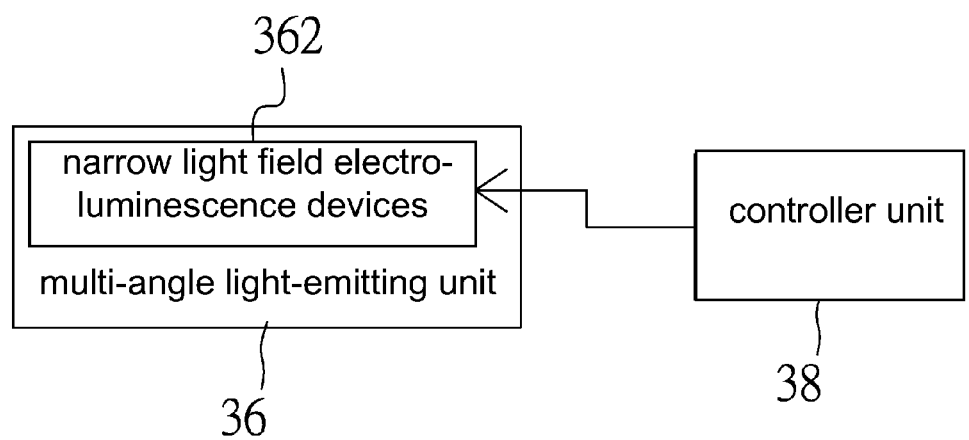
FIG. 3 is a block diagram of the fluorescence microscopy optical apparatus of FIG. 1, showing the relationship between the controller unit and the multi-angle light-emitting unit.

The fluorescence microscopy optical apparatus according to the invention is used to detect an object 5 which emits fluorescence. As shown in FIGS. 1, 2 and 3, the optical apparatus comprises a main body 1, an object lens 2 mounted on the main body 1, and a fluorescence observation device 3. The fluorescence observation device 3 comprises a base 32, a dome 34, a multi-angle light-emitting unit 36, a controller unit 38 and a flexible drive board 30. The base 32 includes an observation support member 322 adapted for being covered by the dome 34, so that the base 32 and the dome 34 cooperatively define an accommodating chamber 340. The dome 34 is further formed with an observation aperture 342 for receiving the object lens 2.

The dome 34 comprises a transparent thermal insulation layer 344 and a heat sink layer 346, with the transparent thermal insulation layer 344 facing the accommodating chamber 340. According to this embodiment, the transparent thermal insulation layer 344 is made of, for example, acrylic material. The heat sink layer 346 is arranged to face away from the accommodating chamber 340, so that the entire outer surface of the transparent thermal insulation layer 344 is completely covered by the inner surface of the heat sink layer 346. The heat sink layer 346 is made of material having a greater thermal conductivity coefficient than the transparent thermal insulation layer 344 and having a lower transparency in the visible spectrum as compared to the transparent thermal insulation layer 344. In a preferred embodiment, the heat sink layer 346 is made of metallic material.

Figure 4:
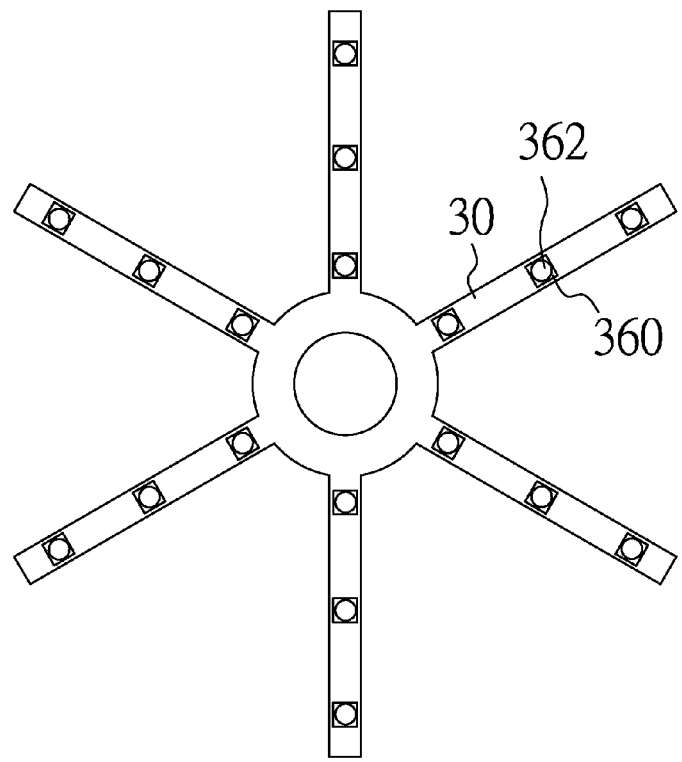
FIG. 4 is a schematic top view of the flexible drive board of the fluorescence observation device shown in FIG. 2.

The multi-angle light-emitting unit 36 comprises a plurality of narrow light field electro-luminescence devices 362 mounted in the dome 34. The term "narrow light field electro-luminescence device" as used herein is meant to indicate an electro-luminescence device from which the light emission is limited within a predetermined solid angular range of several tens degrees, rather than being radiated over 360 degree. As shown in FIG. 4, the narrow light field electro-luminescence devices 362 are light-emitting diode devices, each being welded on a piece of hard circuit board 360 which is electrically connected to the flexible drive board 30. The flexible drive board 30 is configured to have a number of extensions radially extending outwards from a hub member and thermally connected to the heat sink layer 346 of the dome 34, so that the respective narrow light field electro-luminescence devices 362 emit light towards the accommodating chamber 340 defined by the dome 34 via the transparent thermal insulation layer 344.

According to this embodiment, the dome 34 is shaped in arc form. Therefore, the narrow light field electro-luminescence devices 362 mounted at different positions on the dome 34 will emit light at different angles. Further, the narrow light field electro-luminescence devices 362 can be selectively activated to emit light by the controller unit 38, so that the excitation light can be emitted at the desired angle. For example, the narrow light field electro-luminescence devices 362 were arranged into upper, middle and lower rows on the dome 34 and the light emission from the three rows were individually controlled by the controller unit 38, so that the illumination angle of the electro-luminescence devices 362 can be adjusted upon demand and need.

Since the multi-angle light-emitting unit 36 is located close to the object under observation, the light emission from the light-emitting unit 36 only has to travel through a small distance to reach the observed object and, thus, has a significantly reduced light loss compared to the conventional systems used in the traditional fluorescence microscopes. As a result, the fluorescence microscope or fluorescence camera disclosed herein are adapted to use a light source that emits light with less brightness and generates less heat compared to their conventional counterparts, whereby the potential damage to the observed object caused by the heat generated from the light source is minimized.

During use of the invention, an object 5 that may emit fluorescence upon irradiation with excitation light was placed on the observation support member 322 of the base 32 and the dome 34 was then positioned onto the base 32, so that the object 5 was housed within the accommodating chamber 340. The narrow light field electro-luminescence devices 362 were turned on by the controller unit 38 to emit excitation light. Consequently, the object 5 was excited to emit fluorescence, which can be observed visually or recorded photographically through the object lens 2 inserted within the observation aperture 342.

As described above, when the multi-angle light-emitting unit 36 emits excitation light at a small angle, such as at a angle of less than 45 degree relative to the horizontal plane, the excitation light is rarely reflected to the object lens 2 and only a very small proportion of it is scattered back and observed as noise. Therefore, the fluorescence signal is much easier to be observed and recorded as a result of a significant increase in signal-to-noise ratio. Compared with the conventional fluorescence microscopes whose optical design is configured to irradiate excitation light towards the observed object along the object lens direction, resulting in a poor signal-to-noise ratio due to the interference of the reflected excitation light and lifting up the necessity of equipping additional optical or electrical instruments for data modification, the optical apparatus disclosed herein exhibits an improved performance in resolution and an enhanced usage flexibility.

Figure 5:
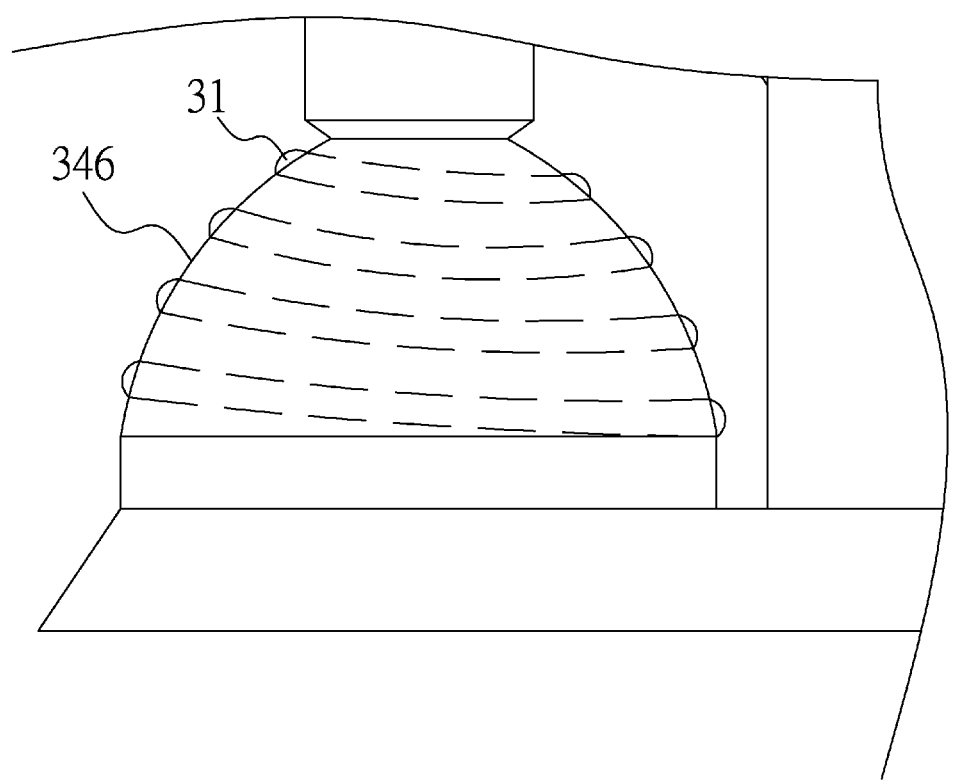
FIG. 5 is a schematic side view of the fluorescence microscopy optical apparatus of FIG. 1, showing a cooling pipe embedded in the heat sink layer.

As the flexible drive board 30 and the narrow light field electro-luminescence devices 362 are mounted in thermal contact with the heat sink layer 346, the heat generated thereby can be rapidly transferred to the outer surface of the dome 34 and then dissipated to the ambient air. In addition, since the transparent thermal insulation layer 344 according to this embodiment is made of acrylic material and exhibits a much lower thermal conductivity coefficient compared with the heat sink layer 346 made of metallic material, the undesired temperature rise in the accommodating chamber 340 and therefore the potential heat damage to the object 5 under observation are avoided. As shown in FIG. 5, the heat sink layer 346 is embedded with a heat sink unit, such as a cooling pipe 31, thereby facilitating the heat dissipation effect. The cooling pipe 31 is at least in part embedded in the heat sink layer 346, through which water is circulated continuously to remove heat from the heat sink layer 346 to facilitate the heat dissipation effect.

Figure 6:
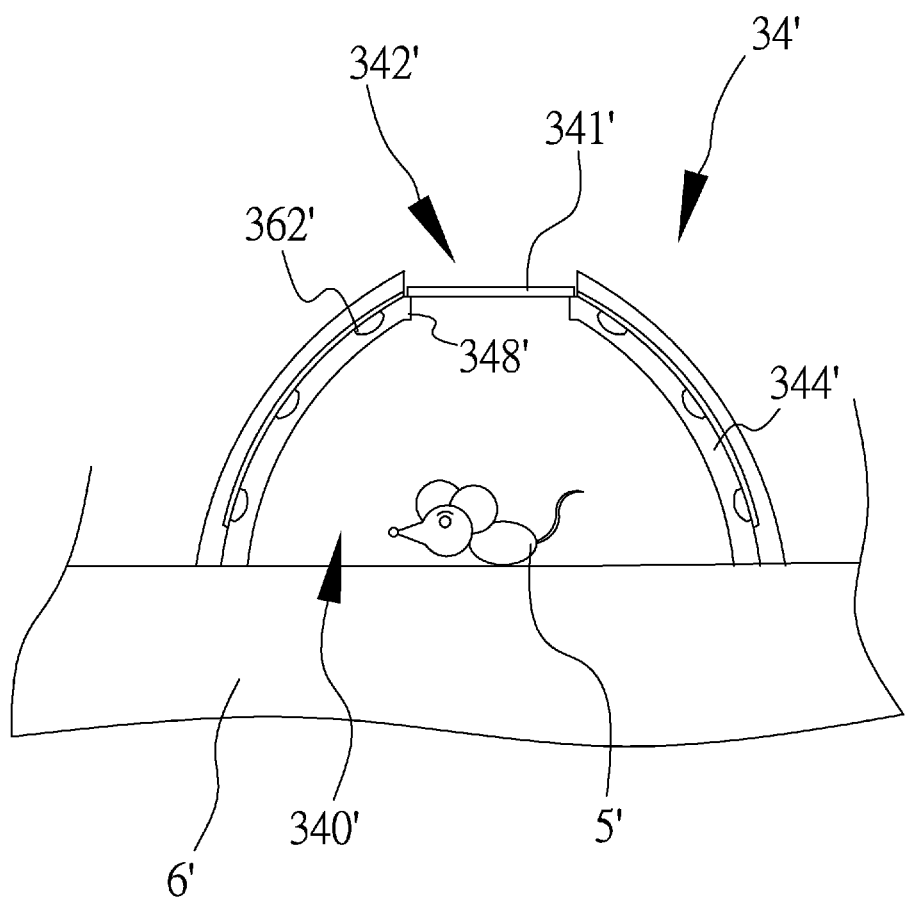
FIG. 6 is a schematic side view of the fluorescence observation device according to the second preferred embodiment of the invention, showing that the fluorescence observation device is placed on a bench table during use.

For an experimental animal with a relatively large body size, such as a fluorescent mouse, a dome 34' built as large as a mouse cage according to the embodiment shown in FIG. 6 may be used alone to accommodate the animal. During observation, the fluorescent object 5' to be observed was placed on a bench table 6' and housed within an accommodating chamber 340' defined by the dome 34' and the bench table 6'. Afterwards, the narrow light field electro-luminescence devices 362' were activated to emit light and the fluorescence response of the object 5' to the excitation light was observed through the observation aperture 342'. In the case where the object 5' under observation is a fluorescent mouse housed within the accommodating chamber 340', the transparent thermal insulation layer 344' of the dome 34' serves to protect the snuffling mouse from heat injury by the narrow light field electro-luminescence devices 362' and prevent the dome 34' and the electro-luminescence devices 362' from being damaged by the mouse or contaminated by mouse droppings.

According to this embodiment, a support flange 348' may be arranged around the observation aperture 342' to support a filter 341' that covers the observation aperture 342'. The filter 341' serves to block unwanted light beams, such as excitation light beams, from passing through the observation aperture 342', thereby facilitating the observation of fluorescence responses.

Figure 7:
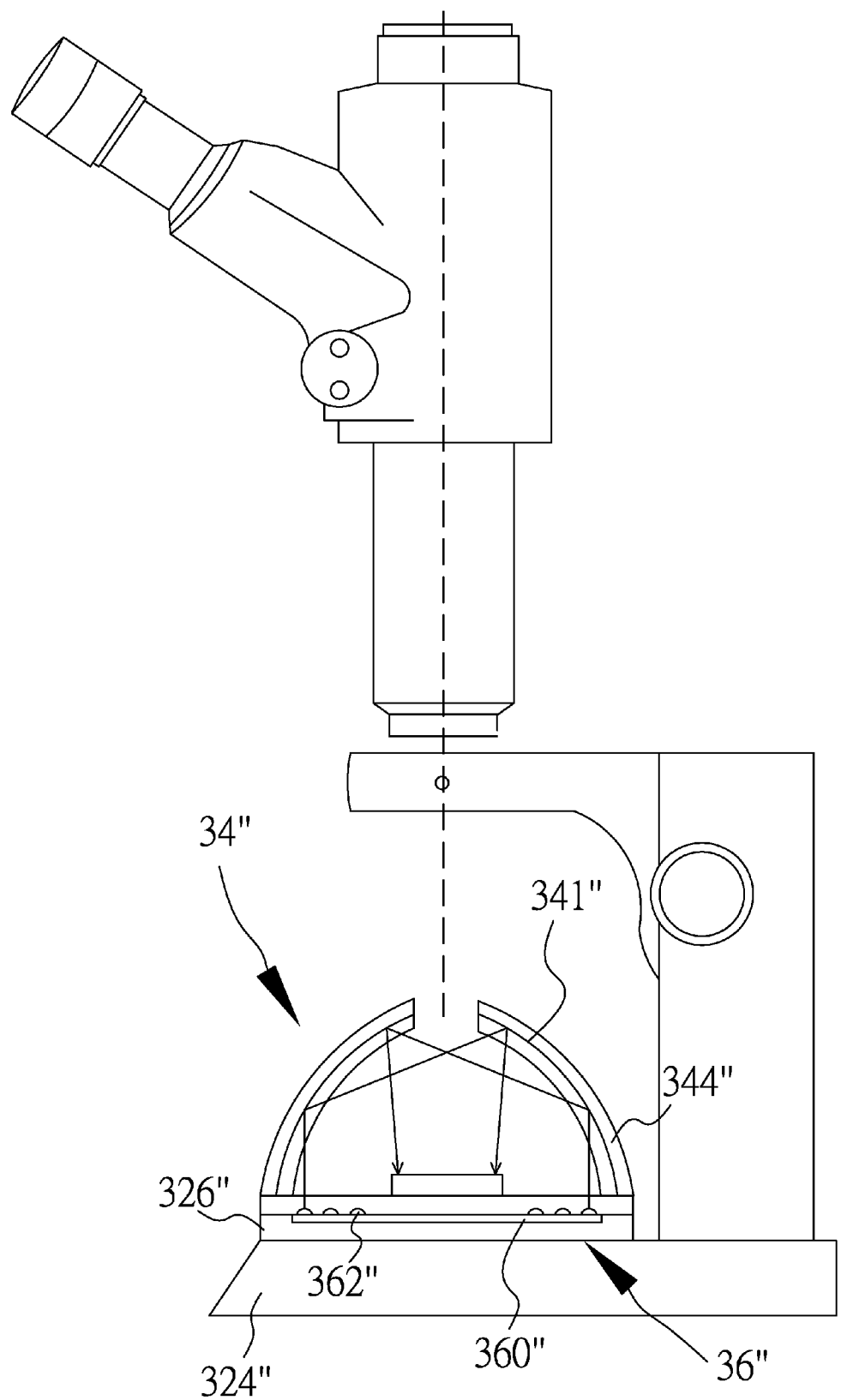
FIG. 7 is a schematic side view of the domed base for use in a fluorescence microscopy optical apparatus according to a preferred embodiment of the invention, showing that the dome is combined with a base on which the narrow light field electro-luminescence devices are mounted.
Figure 8:
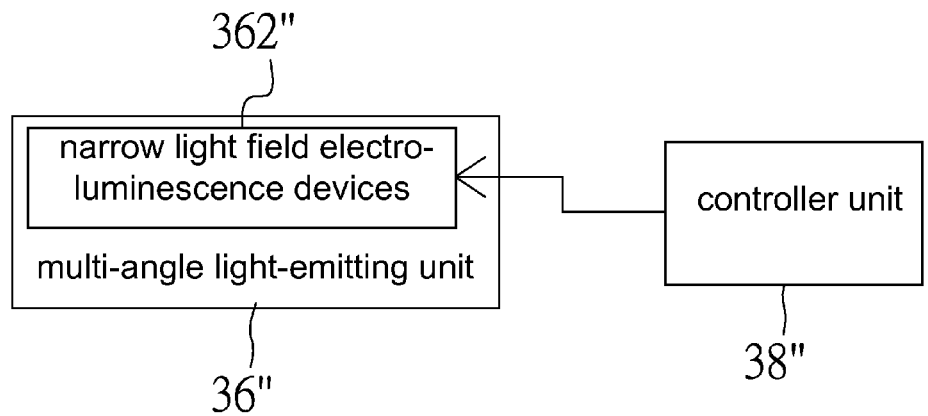
FIG. 8 is a block diagram of the fluorescence microscopy optical apparatus of FIG. 7, showing the relationship between the controller unit and the multi-angle light-emitting unit.

The fluorescence observation device disclosed herein may be directly combined with a microscope base and then installed on the main body of a conventional optical microscope, so as to construct a useful fluorescence microscope. According to the preferred embodiments shown in FIGS. 7 and 8, a base 32" is combined with a dome 34" to constitute a domed base. The base 32" comprises a thermal insulation transparent layer 326" made of acrylic material and a thermal conductive layer 324" mounted on the thermal insulation transparent layer 326" in a manner remote from the accommodating chamber 340". The thermal conductive layer 324" is made of metallic material having a greater thermal conductivity coefficient than the thermal insulation transparent layer 326".

The multi-angle light-emitting unit 36" according to this embodiment further comprises a circuit board 360" thermally connected to the thermal conductive layer 324". The narrow light field electro-luminescence devices 362" are electrically connected to the circuit board 360", so that the excitation light emitted from the narrow light field electro-luminescence devices 362" is directed through the thermal insulation transparent layer 326" and reaches the accommodating chamber 340". Heat generated from the narrow light field electro-luminescence devices 362" and the circuit board 360" is dissipated to the ambient via the thermal conductive layer 324".

Figure 9:
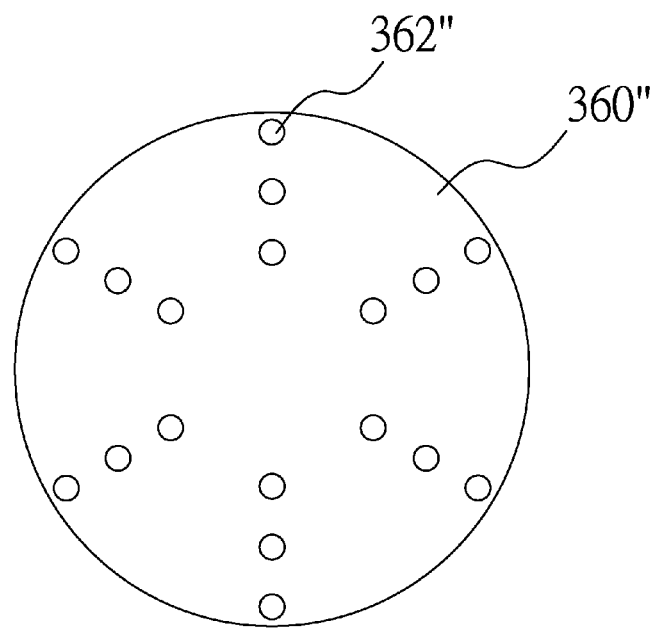
FIG. 9 is a schematic top view of the circuit board mounted in the domed base shown in FIG. 7.
Figure 10:
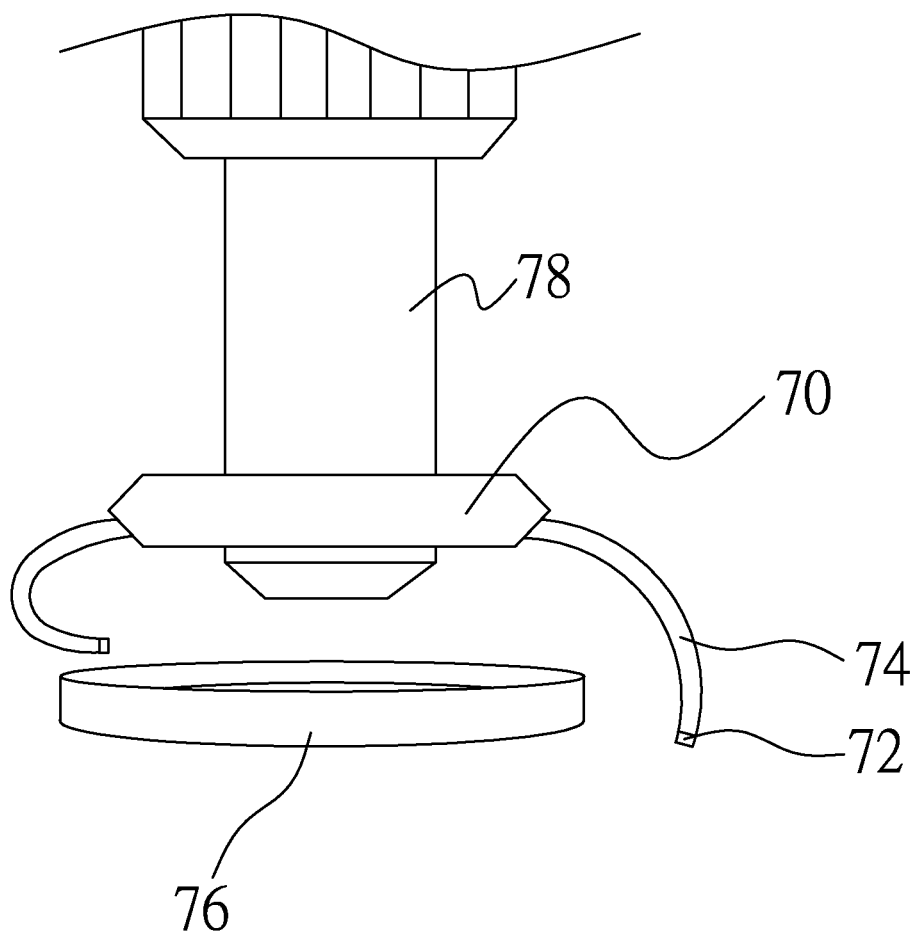
FIG. 10 is a schematic side view of a conventional optical assistive device.
Figure 11:
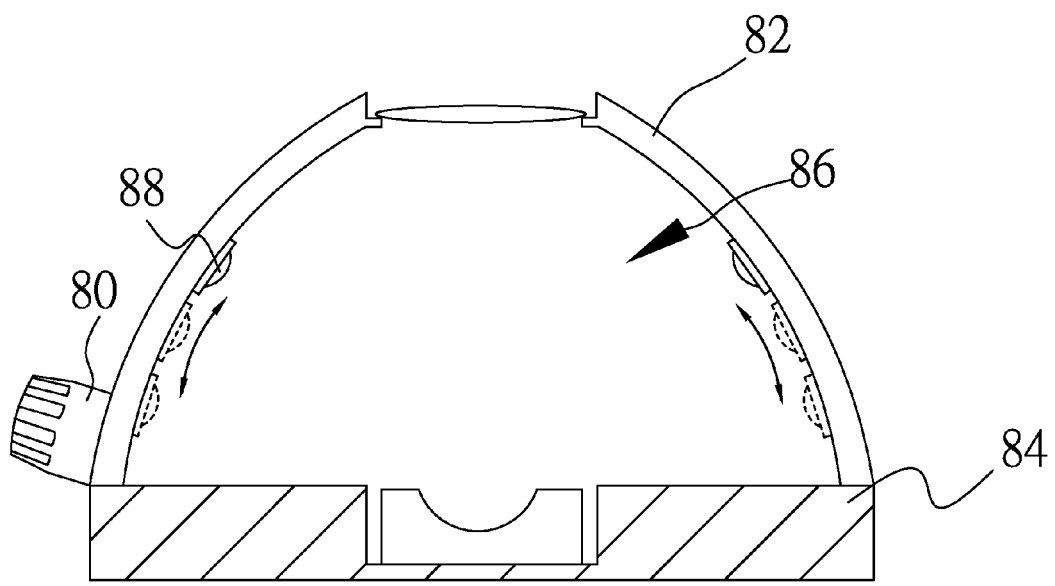
FIG. 11 is a schematic side view of a conventional assistive dome.

Referring to FIG. 9, the narrow light field electro-luminescence devices 362" according to this embodiment were arranged into outer, middle and inner concentric circles on the base 32" and the light emission from the three concentric circles were individually controlled by the controller unit 38". The heat sink layer 346" of the dome 34" has a surface facing the transparent reflection layer 344" and the surface is polished to become a smooth mirror surface that serves as a reflection surface 341". As the respective narrow light field electro-luminescence devices 362" mounted at different positions on the arc-shaped dome 34" emit light at different angles, the light beams emitted therefrom are reflected at different angles from the reflection surface 341". Therefore, a desired light source can be obtained by individually controlling the light emission from the three concentric circles using the controller unit 38". In the embodiment disclosed herein, the LED devices arranged along the same circle may be configured to emit different colors of light, so as to fulfill the need for observing the objects that were genetically engineered to have two different fluorescence genes. For example, the LED devices mounted along the outer circle are ultraviolet-light LEDs and green-light LEDs arranged in an alternate manner.

In the embodiment disclosed herein, the LED devices arranged along the inner circle include six white-light LEDs to provide visible light illumination, whereby the user may easily identify the number of the objects to be observed. It is also apparent to those skilled in the art that the number and location of the narrow light field electro-luminescence devices are described in the embodiments above for illustration purpose only rather than limitation.

In conclusion, the fluorescence observation device, the domed base for use in a fluorescence microscope apparatus and the fluorescence microscope apparatus disclosed herein are provided with multiple narrow light field electro-luminescence devices under the control of the controller unit, so that the narrow light field electro-luminescence devices may, in the case of being installed at different positions on the dome, emit light at different angles and, in the case of being installed on the base, emit light toward the dome where the light is reflected at different angles. By virtue of the structural arrangement, the manufacture cost is reduced and the lifespan of the products is improved.

The heat generated by the narrow light field electro-luminescence devices, the flexible drive board and the circuit board can be rapidly dissipated to the ambient via either the heat sink layer of the dome or the thermal conductive layer of the base. As a result, the temperature in the accommodating chamber is kept constant to protect the observed living organisms from suffering temperature stress, thereby facilitating the efficiency and precision of the experiments. In the case where the object under observation is a fluorescent mouse, the transparent thermal insulation layer serves to protect the mouse from heat injury due to contact with the narrow light field electro-luminescence devices and prevent the light source from being damaged or contaminated by the mouse.

It is important to note that since the fluorescence observation device disclosed herein provides a near-field light source to reduce the loss of excitation light during transmission and since the fluorescent object is observed in ark-field illumination by providing excitation light to thereby eliminate the majority of noise light attributed to the direct reflection of excitation light, the fluorescence observation device disclosed herein can provide a simplified light source design and an improved signal-to-noise ratio. As a result, the fluorescence observation device disclosed herein may be used alone or in combination with a microscopic image capturing device, such as a conventional optical microscope or a microscopic camera, whereby the microscopic image capturing device is made more versatile in usage to fulfill the needs of consumers. The invention achieves all of the intended objects accordingly.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A fluorescence observation device provided with multiple light sources having different illumination angles, for covering on an observation support member and for observing a fluorescent object placed on the observation support member, the fluorescence observation device comprising:
    a dome cooperating with the observation support member to define an accommodating chamber for housing the fluorescent object and formed with an observation aperture, the dome comprising:
        a transparent thermal insulation layer arranged to face the accommodating chamber; and
        a heat sink layer having a surface disposed on a surface of the transparent thermal insulation layer remote from the accommodating chamber, the heat sink layer having a greater thermal conductivity coefficient compared with the transparent thermal insulation layer and having a lower transparency at least in the visible spectrum compared with the transparent thermal insulation layer;

a multi-angle light-emitting unit comprising a plurality of narrow light field electro-luminescence devices for emitting excitation light at different illumination angles towards the accommodating chamber through the transparent thermal insulation layer; and a controller unit for controlling the illumination angles of the narrow light field electro-luminescence devices.

2. The fluorescence observation device according to claim 1, further comprising a base on which the observation support member is disposed.

3. The fluorescence observation device according to claim 2, wherein the multi-angle light-emitting unit is disposed on the base and the surface of the heat sink layer facing the transparent thermal insulation layer is a reflection surface for reflecting the excitation light emitted from the multi-angle light-emitting unit back to the accommodation chamber, and wherein the base comprises a thermal insulation transparent layer disposed to face the accommodation chamber and a thermal conductive layer mounted on a surface of the thermal insulation transparent layer remote from the accommodating chamber and having a greater thermal conductivity coefficient compared with the thermal insulation transparent layer, and wherein the multi-angle light-emitting unit further comprises at least one circuit board thermally connected to the thermal conductive layer.

4. The fluorescence observation device according to claim 1, further comprising a flexible drive board thermally connected to the heat sink layer of the dome, the narrow light field electro-luminescence devices being mounted on the flexible drive board.

5. The fluorescence observation device according to claim 4, further comprising a heat sink unit embedded at least in part in the heat sink layer.

6. A domed base for use in a fluorescence microscopy optical apparatus and for observing a fluorescent object, the domed base comprising:

a base including an observation support member for observing the fluorescent object;

a dome cooperating with the base to define an accommodating chamber for housing the fluorescent object and formed with an observation aperture, the dome comprising:

a transparent thermal insulation layer arranged to face the accommodating chamber; and a heat sink layer having a surface disposed on a surface of the transparent thermal insulation layer remote from the accommodating chamber, the heat sink layer having a greater thermal conductivity coefficient compared with the transparent thermal insulation layer and having a lower transparency at least in the visible spectrum compared with the transparent thermal insulation layer;

a multi-angle light-emitting unit comprising a plurality of narrow light field electro-luminescence devices for emitting excitation light at different illumination angles towards the accommodating chamber through the transparent thermal insulation layer; and a controller unit for controlling the illumination angles of the narrow light field electro-luminescence devices.

7. The domed base according to claim 6, further comprising a flexible drive board thermally connected to the heat sink layer of the dome and a cooling pipe embedded at least in part in the heat sink layer, wherein the narrow light field electro-luminescence devices are mounted on the flexible drive board.

8. A fluorescence microscopy optical apparatus for observing a fluorescent object, comprising:

a main body;

an object lens mounted on the main body; and a fluorescence observation device, comprising:

a base including an observation support member for observing the fluorescent object;

a dome cooperating with the base to define an accommodating chamber for housing the fluorescent object, the dome being formed with an observation aperture, through which the object lens may capture an image of the fluorescent object placed on the observation support member, the dome comprising:

a transparent thermal insulation layer arranged to face the accommodating chamber; and a heat sink layer having a surface disposed on a surface of the transparent thermal insulation layer remote from the accommodating chamber, the heat sink layer having a greater thermal conductivity coefficient compared with the transparent thermal insulation layer and having a lower transparency at least in the visible spectrum compared with the transparent thermal insulation layer;

a multi-angle light-emitting unit comprising a plurality of narrow light field electro-luminescence devices for emitting excitation light at different illumination angles towards the accommodating chamber through the transparent thermal insulation layer; and a controller unit for controlling the illumination angles of the narrow light field electro-luminescence devices.

* * * * *